Jan. 11, 1949.　　　L. W. BIEKER ET AL　　　2,458,673
FILTER UNDERDRAIN
Filed Aug. 8, 1946　　　2 Sheets-Sheet 1
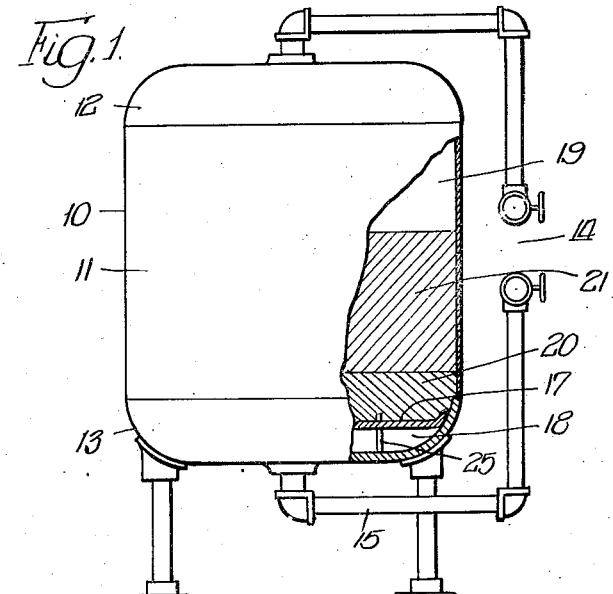
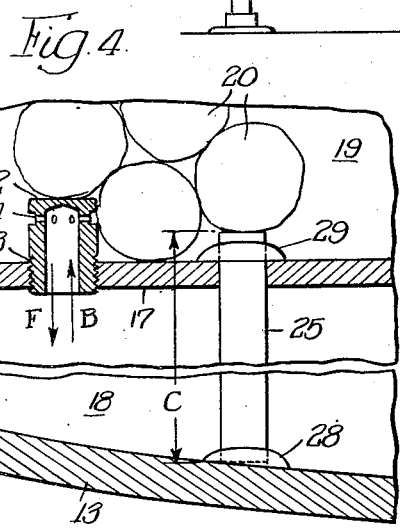
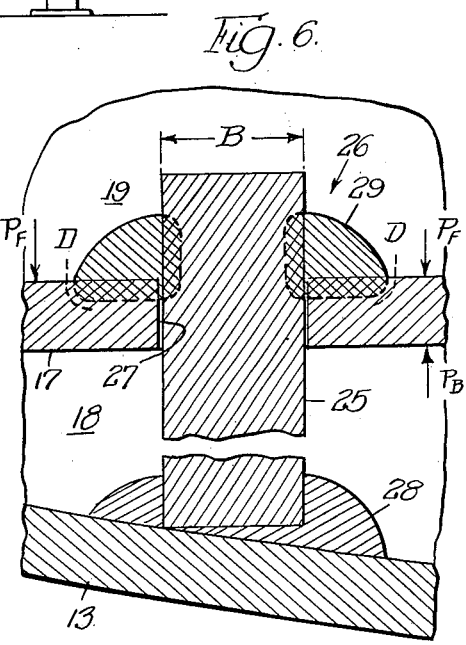
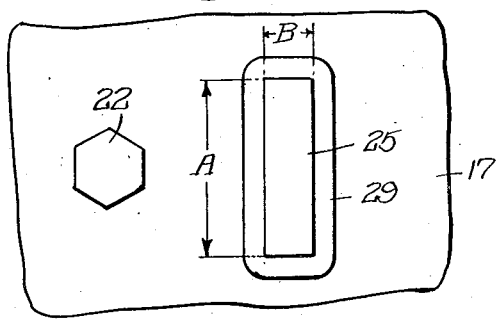
INVENTORS
Lawrence W. Bieker,
BY William J. Lewis,
F. D. Prager
ATTY.

Jan. 11, 1949.  L. W. BIEKER ET AL  2,458,673
FILTER UNDERDRAIN
Filed Aug. 8, 1946  2 Sheets-Sheet 2
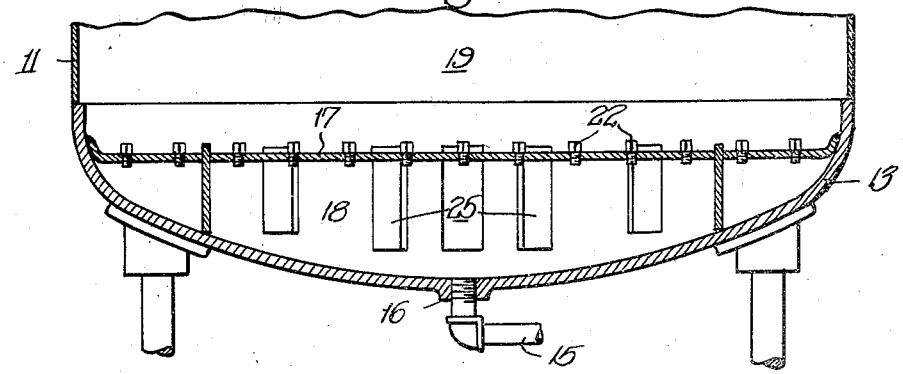
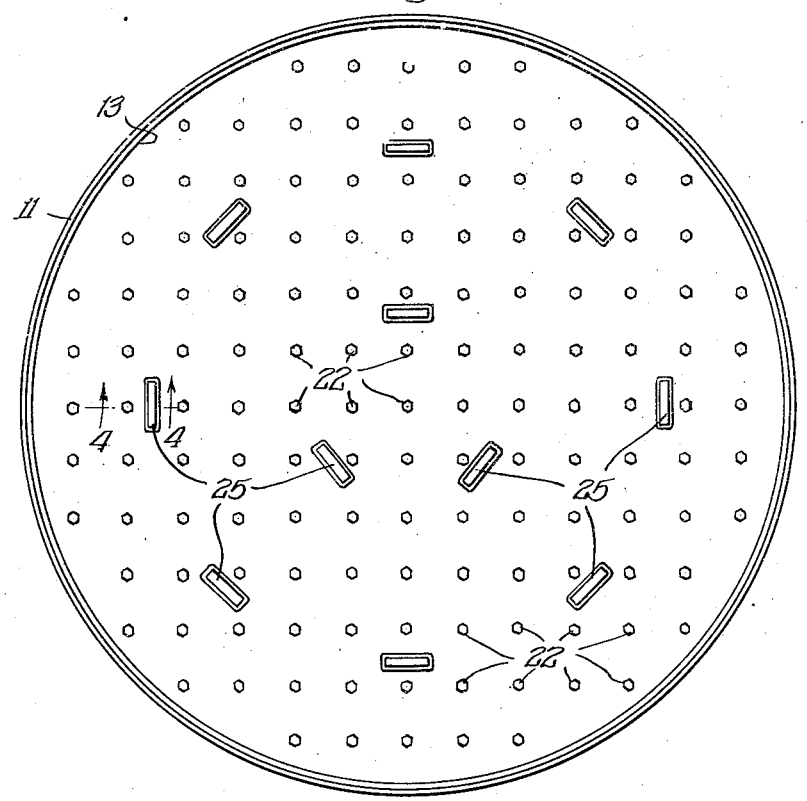
INVENTORS.
Lawrence W. Bieker,
BY William J. Lewis,
F. D. Prager
ATTY Patented Jan. 11, 1949

2,458,673

UNITED STATES PATENT OFFICE 2,458,673

FILTER UNDERDRAIN

Lawrence W. Bieker, Munster, Ind., and William J. Lewis, Chicago, Ill., assignors to Graver Tank & Mfg. Co., a corporation of Delaware Application August 8, 1946, Serial No. 689,139

2 Claims. (Cl. 210—148)

This invention relates to liquid treatment, and particularly to sand filters or the like, with an improved underdrain construction.

A primary object of our invention is to avoid certain difficulties that we found in underdrains previously known. We are, primarily, referring to filter tanks constructed of steel, with an underdrain strainer plate also made of steel, in the lower part of the tank. Such constructions have been used for many years and with good success; however we found that they were not entirely free from problems. In this respect, improvements are provided by our present invention.

A specific object is, to secure such an underdrain plate to the tank so that the plate can be made relatively thin and economical, and still withstand the substantial pressure differentials and other loads to which it is exposed in operation. The significance of making the plate relatively thin will be understood when it is considered that the cost of such an underdrain plate comprises, not only a certain weight of steel, but more important, the labor of installing a great many distributor nozzles in the plate. The material cost for a steel plate of ½ inch thickness is about twice the material cost for a plate of ¼ inch thickness; and the labor cost for forming the necessary number of holes for the nozzles in a ½ inch steel plate is almost twice the cost for a ¼ inch plate. Thus, any fractional inch that can be spared, in designing and dimensioning the underdrain plate, means a definite saving. However, the thinner the plate, the greater is the need for structural protection against overloads. Therefore, our invention is specially concerned with such structural protection.

Another specific object is, to provide such structural protection in a manner assuring the greatest functional efficiency attainable. We are referring to the hydraulic and sanitary efficiency. Most plates of this type are not only welded to the tank along the edge of the plate; they must be additionally stayed to the bottom of the tank, adjacent the center of the plate, or between the center and the edge, or both. We found that the additional supports, as previously made, sometimes involved difficulties with respect to the free flow of liquid to and from the filter, and often allowed accumulations of dirt, bacteria and the like. Our invention avoids obstructions to said flows with a minimum of cost, and provides a maximum of safety against said accumulations. This latter point is extremely important for most users of filters, since a filter either serves to remove bacterial and similar pollution from water and the like, or at least a filter should not add to such pollution. Nevertheless, many types of filter underdrains are quite problematical in this respect; and while the basic type with steel underdrain plate and supports, as previously known, compares very favorably with other basic types, substantial improvements are added to this type, by our invention.

These objects and advantages will be clearly understood upon a consideration of the specification which follows, wherein one specific embodiment is shown. This embodiment consists of a vertical sand filter of the pressure type, for the removal of turbidity, coagulated color, suspended iron, unemulsified oil or the like, from water and similar liquids. The invention is also applicable to other apparatus of the filter type; for instance, anthracite filters, zeolite softeners, etc., of the pressure or gravity type, either vertical or horizontal.

In the drawing,

Fig. 1 is a side elevation, partly in section, of the present embodiment.

Fig. 2 is a sectional elevation, on a larger scale, of an essential detail from Fig. 1.

Fig. 3 is a plan view of the detail of Fig. 2.

Fig. 4 is a sectional view, on a scale larger than Fig. 2, of an important detail from said Fig. 2.

Fig. 5 is a plan view of the detail of Fig. 4.

Fig. 6 is a sectional view, on a scale larger than Fig. 4, of a detail from said Fig. 4.

The filter tank 10 is made of steel. It is of the vertical pressure type, and composed of the usual upright, cylindrical shell 11, dished top 12, and dished bottom 13. The filter has a valve nest 14, including a pipe 15 which leads to the center of the bottom head 13. Here this pipe enters the tank, through a conventional weld fitting 16. Adjacent the top of the bottom head 13, we provide an underdrain strainer plate 17 of steel, which divides the interior of the filter into a lower underdrain chamber 18, and an overlying filtration and freeboard chamber 19. In the latter chamber we provide the usual graded bed of gravel 20 immediately upon the plate 17, and a bed of filter sand 21 on top of the gravel bed. The plate 17 has a considerable number of strainer nozzles 22, desirably made of stainless steel, and which are fitted into holes in this plate, for instance by screw threads 23. Each strainer nozzle has a number of openings 24, whereby the filtration and freeboard chamber communicates with the underdrain chamber, through the underdrain plate.

In order to hold the underdrain plate safely against the uplift due to a backwashing operation, we provide vertically upstanding holder bars 25 made of steel, suitably distributed over the plate and spaced from the edge of the plate as well as from the strainer nozzles; said bars being secured to the bottom head 13 and to the underdrain plate 17. These bars also cooperate to support the weight of the plate and overlying materials, plus the load due to back pressure, during a downward flow of water through the filter.

The bars are secured to the plate by joints 26, most clearly shown in Fig. 6. At each position where such a joint is to be formed, we provide a slot 27 in the plate 17. We first install the vertical bars 25 on the bottom 13, for instance by securing each bar to said bottom with a continuous weld seam 28 surrounding the foot of the bar; we then lower the underdrain plate 17, with preformed slots 27 therein, over the series of upstanding bars 25, and into the bottom head 13, so that the bars extend into, and desirably a short distance through the slots 27. We then seal these slots, and at the same time fasten the plate to the bars, by laying down a continuous weld seam 29, generally a fillet weld, entirely around each bar, on the top side of the plate, that is on the side to be exposed to the filtration and freeboard chamber 19. This side is easily accessible for the purpose of forming a weld seam as indicated. Generally, we also seal the edge of the underdrain plate to the bottom head, by a continuous weld seam (not shown), on said top side of the plate.

For reasons to be explained presently, we use flat bars 25, of rectangular cross section. We prefer to make these bars about two to three inches wide, as to the dimension A marked in Fig. 5, while giving them a thickness or dimension B, such as about ½ inch, when the plate 17 has a thickness of about ¼ inch as usual. The length of the bars, or dimension C, must suit the tank dimensions; it generally ranges from about 3 to about 20 inches. By using such bars we are keeping the cost extremely small, even in large filters. At the same time the various loads encountered in operation of the filter are carried without difficulty.

The thickness of the under-drain strainer plate, generally about ¼ inch, limits the size of the fillet weld 29, which according to our invention will frequently be made with a welding electrode of ¼ inch thickness thereby providing a maximum of weld seam efficiency at a minimum of expense under the conditions as stated. Since the thickness of the plate limits the size of the weld seam, a definite length of this seam is required in order to hold the plate against certain loads. Otherwise there would be a danger of tearing the plate from its joint with the bar, either upwardly or downwardly. This will be better understood by means of the following example.

Let us assume that the sand filter 10 serves to remove turbidity from water for human consumption and has a diameter of 8 ft., or an area of approximately 50 sq. ft. or 7200 sq. in. The total area of the openings 24 is then conventionally made about .25% of this area, that is, about 18 sq. in., and this total is generally provided by a great many small openings 24; each strainer nozzle 22 having a number, such as six, of these openings, and the nozzles being spaced at distances such as 5 inches to 6 inches. Under the assumptions made, we have about 200 to 300 filter nozzles 22, with a total of about 1200 to 1800 orifices 24; each of these orifices accordingly having an area of about .01 to .015 sq. in. Therefore, a diameter of about ⅛ inch is more or less usual, for such orifices; it corresponds to an area of about .01 to .015 sq. in.

When backwashing the filter, we generally apply an upward flow at a rate of about 10 to 20 gallons per minute per sq. ft. of filter area, depending on well-known factors such as the water temperature, the size of the sand grains, etc. Thus the total up-flow may amount to as much as 1000 gallons per minute, and the flow through each orifice 24 may be as much as .83 gallon per minute. The backpressure $P_B$ created by such a flow, through a ⅛ inch orifice, depends on the smoothness of the orifice; in practice it is almost 10 pounds per sq. in.; resulting in a total uplift of more than 30 tons on the plate 17. The weight of the gravel bed and of the plate itself can be deducted, thereby generally reducing the net uplift in the present example to about 28 tons; but with allowance for shock loads due to occasional surges and the like the maximum upward load may well be as much as 50 tons. This puts each of the bars 25 on tension; the tensional stress amounting to several tons in each of the bars, when using ten to twelve bars, more or less uniformly spaced as shown.

The maximum amount of water flowing downward through the sand bed during normal filter operation is only about 2 gallons per minute per sq. ft. of filter area, or $\frac{1}{10}$ of the backwashing flow, thereby producing only $\frac{1}{100}$ of the aforementioned backpressure in a downward direction. This is rather insignificant. However, the interstices between granules of filter sand, in the compacted sand bed that is present during filtration, generally are very small and partly clogged by intercepted dirt; thereby resulting in a loss of head due to the downflow of the water, which often amounts to 1 or 2 lbs. per sq. in. of filter area at the start, and 4 to 6 lbs. per sq. in. at the end of a filtering operation. A great portion, if not all of this loss of head or differential pressure is transmitted by the sand and gravel beds to the underdrain strainer plate 17, so that a downward pressure load of as much as 22 tons is encountered. To this we now must add the weight of the sand bed as well as the gravel bed, or generally about 10 tons. Accordingly, the total downward load $P_F$ on the underdrain plate 17, during normal filtration, can be calculated at approximately 32 tons.

The ¼ inch strainer plate is secured to the top of each bar 25 by means of the ¼ inch fillet weld 29. Such a weld has great strength; generally greater than that of the plate itself. However, the plate metal adjoining such a weld is slightly weakened. Application of an upward pressure $P_B$ of several tons to the underdrain plate 17 around a bar 25 results in a tendency to shear the plate away, in the approximate region of the line marked D. This line designates an annular region of shearing stress around the bar 25 and weld seam 29. The shear resistance in such a region, adjacent to a ¼ inch fillet weld seam on a ¼ inch plate, can be assumed to be about one ton per linear inch of weld seam. Thus, in order to safely counteract the load $P_B$, we often need a weld seam 29 of 5 to 6 inches length for each bar 25. The downward pressure $P_F$ is adequately resisted by such a weld seam, the length of which amounts to several times the thickness of the plate 17. Weld seams of about 6 inches in length can be provided around bars 25 of different cross sections or shapes, so long as the bar periphery is about 6 inches. However, we found it most economical to provide such length of the weld seam by a bar of rectangular cross section as described, since it is easier to burn relatively long slots 27 of approximately ½ inch width into the ¼ inch underdrain plate than to form holes of other shapes, with the necessary peripheral length. The strength of the metal in the flat bar 25 itself is easily sufficient for the purposes explained, considering the wellknown coefficients and formulae for tension and compression members as described.

In some apparatus of the filter type, such as high-rate zeolite softeners with beds 21 of resinous material, the flow rates differ materially from those used in sand filters; for instance they may amount to 10 gallons per minute per sq. ft. of filter area in a downward direction and only 3 to 5 gallons per minute per sq. ft. in an upward direction. The safety factor for the beams 25, when used as support columns, tends to be less in this instance than in that described above; however the actual difference is not as great as it might appear, because the pressure drop across the bed 21 generally is much less than in the example given; the grain sizes of the filter materials being greater.

Thus we found that the simple and economical combination of spaced, flat, upstanding bars 25, extending into or through the slots 27 and welded in as at 29, provides an expedient of broad application, within the present field for apparatus of the filter type.

While providing a safe and economical holding device for the underdrain plate, the spaced, flat, upstanding bars 25 also facilitate the most efficient functioning of the filter, since they offer no significant obstruction to the flow of the water, either upward or downward, in the underdrain chamber. Finally, these bars offer, substantially, a minimum of surface for the accumulation of slime, deposits or the like, which would interfere with the proper use of certain filters.

We claim:

1. Apparatus of the filter type, comprising a steel tank; a steel underdrain plate in the bottom of said tank, said plate having elongated slots at positions distributed over the plate, and each of said slots having a periphery the length of which is several times the thickness of the plate; strainer nozzles distributed over said plate and spaced from said slots; flat steel bars secured to the bottom of the tank, upstanding therefrom toward said positions, and extending into said slots, each bar being welded to said plate by a continuous weld seam, on the top side of said plate, surrounding the respective bar.

2. Apparatus of the filter type according to claim 1, wherein said steel bars extend into and slightly through said openings, each bar being welded to said plate by a continuous fillet weld seam, at the top of said plate, surrounding the respective bar.

LAWRENCE W. BIEKER,
WILLIAM J. LEWIS.

REFERENCES CITED

The following references are of record in the file of this patent:

UNITED STATES PATENTS

| Number | Name | Date |
|---|---|---|
| 737,325 | Bommarius | Aug. 25, 1903 |
| 1,181,762 | Hathaway | May 2, 1916 |
| 1,704,925 | Robertson | Mar. 12, 1929 |
| 1,891,061 | Friend et al. | Dec. 13, 1932 |
| 1,903,611 | Dotterweich | Apr. 11, 1933 |